United States Patent [19]

Tsukada et al.

[11] Patent Number: 5,286,292

[45] Date of Patent: Feb. 15, 1994

[54] METHOD OF TREATING FLY ASH AND FLY ASH CEMENT

[75] Inventors: Kazuhisa Tsukada; Takeshi Kuroda; Takane Mukaino; Yukinori Saiki, all of Sakura, Japan

[73] Assignee: Onoda Cement Co., Ltd., Onoda, Japan

[21] Appl. No.: 906,270

[22] Filed: Jun. 26, 1992

[30] Foreign Application Priority Data

Jul. 5, 1991 [JP] Japan .................................. 3-165515
Mar. 11, 1992 [JP] Japan .................................. 4-052698

[51] Int. Cl.$^5$ .................. C04B 7/26; C04B 18/08; C04B 20/02
[52] U.S. Cl. .................................. 106/705; 106/713; 106/405; 106/819; 106/DIG. 1; 264/344; 264/DIG. 49
[58] Field of Search ............... 264/DIG. 49, 232, 340, 264/344; 106/638, 705, 713, 405, 819, DIG. 1; 423/343

[56] References Cited

U.S. PATENT DOCUMENTS

| | | | |
|---|---|---|---|
| 2,576,565 | 11/1951 | Brown | 264/DIG. 49 |
| 4,159,310 | 6/1979 | Reynolds et al. | 423/78 |
| 4,624,711 | 11/1986 | Styron | 106/DIG. 1 |
| 4,652,433 | 3/1987 | Ashworth et al. | 423/112 |
| 4,663,507 | 5/1987 | Trerice | 264/DIG. 49 |

FOREIGN PATENT DOCUMENTS 492460 11/1949 Belgium .

OTHER PUBLICATIONS

Boles, "Fly Ash Facts for Highway Engineers", Federal Highway administration, Jul. 1987, pp. 11–17.
Buck et al. "Studies of the Constitution of Fly Ash Using Selective Dissolution", U.S. Army Corps of Engineers, May 1983.

*Primary Examiner*—Mark L. Bell
*Assistant Examiner*—Michael Marcheschi
*Attorney, Agent, or Firm*—Frishauf, Holtz, Goodman & Woodward

[57] ABSTRACT

Commercially available fly ash is prepared and charged in a vessel. A halogen gas is supplied to the vessel and is brought into contact with the fly ash in the vessel.

18 Claims, No Drawings

METHOD OF TREATING FLY ASH AND FLY ASH CEMENT

BACKGROUND OF THE INVENTION

1. Field of the Invention

The present invention relates to a method of treating fly ash for improving the properties of fly ash and a fly ash cement containing the treated fly ash.

2. Description of the Related Art

Fly ash produced as a byproduct of coal combustion in a thermal power station or the like has been conventionally popular as a material for a fly ash cement. The fly ash cement containing such fly ash requires a smaller amount of water than an ordinary Portland cement itself so as to obtain the same workability, can improve fluidity of the concrete, and can reduce water permeability. The fly ash cement has many excellent properties such that contraction during drying can be reduced, hydration heat can be reduced, and the chemical resistance can be increased. For these reasons, the fly ash cement has been widely used in dam and harbor works.

As an antipollution countermeasure, a lot of power plants employ a method of reducing the combustion temperature of powdered coal to decrease the amount of $NO_x$ generated in the power plants. For this reason, the unburned carbon contained in the fly ash is increased in amount. Therefore, when an air entraining agent generally added to the cement is added to the fly ash cement, most of the air entraining agent is adsorbed by the carbon in the fly ash. The air entraining agent cannot sufficiently achieve its function.

On the other hand, the fly ash cement is said to have a lower strength than the ordinary Portland cement itself, and the following techniques are proposed to solve this problem.

These techniques are emplified by a method of increasing the fineness of fly ash, as described in Concrete Journal 7(2), 28–37 (1969), a method of activating fly ash with an acid, as described in U.S. Pat. No. 3,953,222, and a method of curing fly ash at a high temperature, as described in J. Am. Concr. Inst., 76(4), 537–550 (1979).

The above methods, however, require pulverization energy, a post-treatment of the acid, or high-temperature curing, resulting in complicated processes. Therefore, these conventional methods are not necessarily satisfactory.

SUMMARY OF THE INVENTION

It is the first object of the present invention to provide a method of treating fly ash to reduce adsorption of an air entraining agent, and a fly ash cement containing the treated fly ash.

It is the second object of the present invention to provide a method of treating fly ash to obtain fly ash from which a high-strength fly ash cement can be obtained without requiring any complicated process, and a fly ash cement containing the treated fly ash.

According to an aspect of the present invention, there is provided a method of treating fly ash, comprising the steps of preparing fly ash and bringing a halogen gas into contact with the fly ash.

According to another aspect of the present invention, there is provided a fly ash cement containing fly ash treated by bringing it into contact with a halogen gas.

Additional objects and advantages of the invention will be set forth in the description which follows, and in part will be obvious from the description, or may be learned by practice of the invention.

DETAILED DESCRIPTION OF THE PREFERRED EMBODIMENTS

The present inventors have made extensive studies to achieve a method of treating fly ash to reduce adsorption of an air entraining agent, and a method of treating fly ash to obtain fly ash from which a high-strength fly ash cement can be obtained without requiring any complicated process. Surprisingly, the present inventors found that the above objects could be achieved by a simple method of bringing a halogen gas into contact with the fly ash. The present invention has been made based on this findings.

Fly ash used in the present invention is not limited to any specific one. Conventional fly ash for fly ash cements can be appropriately used.

A halogen gas may be used singly or may be diluted with another gas to control the reactivity. Examples of the gas used to dilute the halogen gas are nitrogen gas, argon gas, neon gas, perfluorohydrocabon gas, oxygen gas, and carbon dioxide gas. The halogen gas used in the present invention is not limited to a specific one. However, fluorine gas and chlorine gas can be appropriately used.

The pressure at which a halogen gas is brought into contact with fly ash is preferably the atmospheric pressure, but is not limited to this. This process can be appropriately performed at a pressure higher or lower than the atmospheric pressure. When the fly ash is treated at a reduced pressure, a halogen gas is preferably singly used without dilution. The treatment temperature is not limited to a specific one. However, the process is preferably performed at room temperature from the economical point of view. The treatment time must be prolonged when the concentration of a halogen gas used is decreased. The process can be a batch or continuous process.

When fly ash is treated as described above, the adsorption amount of the air entraining agent to the fly ash can be reduced. The decrease in adsorption amount of the air entraining agent is assumed to be caused by adsorption of a halogen gas to the unburned carbon in the fly ash. That is, it is surmised that when the halogen gas is adsorbed to the unburned carbon in the fly ash, wettability and affinity of the unburned carbon are improved and the adsorption amount of the air entraining agent is reduced.

The strength of the fly ash cement can be increased by the above treatment. A mechanism of increasing the strength is not yet clarified. It is, however, assumed that $SiO_2$, $Al_2O_3$ and so on as fly ash components are combined with a halogen gas to increase the strength. The effect of the increase in strength is remarkably large when fluorine gas is used as a halogen gas.

The adsorption amount of the air entraining agent to the fly ash can be simulated by measuring the adsorption amount of methylene blue.

EXAMPLES

Examples using fluorine gas and chlorine gas as halogen gases will be described below.

Commercially available fly ash having chemical and physical properties in Table 1 was prepared, and this fly ash was charged in a cylindrical reaction vessel made of pyrex (tradename) available from Corning Glass Works.

TABLE 1

| Chemical Component (%) | Ig · loss | 6.2 |
|---|---|---|
| | SiO$_2$ | 55.1 |
| | Al$_2$O$_3$ | 26.3 |
| | Fe$_2$O$_3$ | 5.4 |
| | CaO | 3.3 |
| | MgO | 1.7 |
| | SO$_3$ | 0.53 |
| | Unburned Carbon | 4.5 |
| Blaine Specific Surface Area (cm$^2$/g) | | 4,150 |
| Specific Gravity (g/cm$^3$) | | 2.21 |
| Residue on 44 μm sieve (%) | | 18.3 |
| Residue on 74 μm sieve (%) | | 6.6 |

This vessel was evacuated to 2.5 mmHg, and fluorine or chlorine gas as a halogen gas was supplied to the vessel at room temperature to bring the halogen gas into contact with the fly ash in the vessel. The conditions of this treatment are summarized in Table 2. After the treatment, a methylene blue adsorption test was conducted. In the test, the adsorption amount of methylene blue was measured complying with CAJS (Cement Associations of Japan Standard) I-61-1986. In Table 2, fly ash treated with fluorine gas is given as Example 1, fly ash treated with chlorine gas is given as Example 2, and the adsorption amounts of methylene blue of Examples 1 and 2 are also summarized in Table 2.

For the purpose of comparison, a methylene blue adsorption test of similar fly ash was conducted without bringing it into contact with a halogen gas. The resultant sample was given as Comparative Example 1, and its test results are also summarized in Table 2.

TABLE 2

| | Treatment Conditions | | | Adsorption |
|---|---|---|---|---|
| | Partial Pressure of Fluorine (mmHg) | Partial Pressure of Chlorine (mmHg) | Treatment Time (min.) | Amount of Methylene Blue (mg/g) |
| Example 1 | 50 | — | 10 | 0.24 |
| Example 2 | — | 50 | 60 | 0.26 |
| Comparative Example 1 | — | — | — | 0.45 |

As is apparent from Table 2, the fly ash samples treated with the halogen gases were found to have smaller adsorption amounts of methylene blue than the nontreated fly ash of Comparative Example 1. It was found that the fly ash samples treated by the method of the present invention were found to reduce the adsorption amounts of the air entraining agent.

The fly ash in Table 1 was charged in a pyrex vessel following the same procedures as described above, and the vessel was evacuated to 2.5 mmHg. Fluorine gas was supplied to the vessel at room temperature to bring the fluorine gas into contact with the fly ash in the vessel. At this time, the partial pressure of fluorine and the treatment time were changed. After the treatment, the fly ash treated with fluorine gas was removed from the vessel and was mixed n ordinary Portland cement at a mixing ratio of 25 wt % or 10 wt % of the total weight to obtain a fly ash cement. Treatment conditions using fluorine gas and the mixing ratio of the fly ash to the obained fly ash cement are summarized in Table 3. Flow values, bending strengths, and compressive strengths of the resultant fly ash cement samples were measured in a mortar test complying with JIS (Japanese Industrial Standard) R 5201-1987.

Fly ash cement samples each containing the fly ash in a mixing ratio of 25 wt % are given as Examples 3 to 5, and a fly ash cement sample containing the fly ash in a mixing ratio of 10 wt % is given as Example 6. Flow values, bending strengths, and compressive strengths of the fly ash cement samples of Examples 3 to 6 are also summarized in Table 3.

For the purpose of comparison, fly ash cement samples obtained by mixing the fly ash in ordinary Portland cement in mixing ratios of 25 wt % and 10 wt % of the total weight without bringing fluorine gas into contact with the fly ash were tested following the same procedures as in Examples 3 to 6, and the resultant samples were given as Comparative Examples 2 and 3. The test results of Comparative Examples 2 and 3 are also summarized in Table 3.

TABLE 3

| | Fluorine Treatment Conditions | | Fly Ash Mixing Ratio (%) | Flow Value (mm) | Mortar Test Results | | | | | |
|---|---|---|---|---|---|---|---|---|---|---|
| | Partial Pressure of Fluorine (mmHg) | Treatment Time (min.) | | | Bending Strength (kgf/cm$^2$) | | | Compressive Strength (kgf/cm$^2$) | | |
| | | | | | 3 days | 7 days | 28 days | 3 days | 7 days | 38 days |
| Example 3 | 50 | 10 | 25 | 243 | 32 | 46 | 66 | 142 | 215 | 358 |
| Example 4 | 50 | 60 | 25 | 244 | 32 | 45 | 68 | 136 | 230 | 369 |
| Example 5 | 200 | 10 | 25 | 245 | 31 | 42 | 69 | 122 | 214 | 381 |
| Comparative Example 2 | — | — | 25 | 247 | 29 | 36 | 53 | 115 | 161 | 262 |
| Example 6 | 50 | 60 | 10 | 246 | 33 | 48 | 70 | 146 | 228 | 378 |
| Comparative Example 3 | — | — | 10 | 246 | 32 | 44 | 67 | 142 | 204 | 338 |

As is apparent from Table 3, when Examples 3 to 5 were compared with Comparative Example 2 and Example 6 was compared with Comparative Example 3 since comparison is to be made on the basis of the identical mixing ratios, the flow values of the examples using the fly ash treated with fluorine gas were kept substantially constant as compared with the comparative examples using the nontreated fly ash, but had much higher strengths than those of the comparative examples.

As is apparent from the above description, it is apparent that a method of treating fly ash to reduce adsorption of an air entraining agent and a method of treating fly ash to obtain fly ash from which a high-strength fly ash cement can be obtained without requiring any complicated process can be achieved.

Additional advantages and modifications will readily occur to those skilled in the art. Therefore, the invention in its broader aspects is not limited to the specific details, shown and described herein. Accordingly, various modifications may be made without departing from the spirit or scope of the general inventive concept as defined by the appended claims and their equivalents.

What is claimed is:

1. A method of treating fly ash consisting essentially of the steps of:
   charging fly ash in a vessel; and
   supplying a halogen gas to the vessel thereby bringing the halogen gas into contact with the fly ash.

2. The method according to claim 1, wherein the halogen gas is fluorine gas.

3. The method according to claim 1, wherein the halogen gas is chlorine gas.

4. In a fly ash cement consisting essentially of fly ash, Portland cement, wherein the improvement comprises the fly ash being treated by bringing the fly ash into contact with a halogen gas and the fly ash being in an amount of 10 to 25% by weight.

5. The cement according to claim 4, wherein the halogen gas is fluorine gas.

6. The cement according to claim 4, wherein the halogen gas is chlorine gas.

7. The method according to claim 1, wherein the halogen gas is at a partial pressure of 50 to 200 mmHg and is selected from the group consisting of fluorine and chlorine; and the method is carried out for a treatment time of 10 to 60 minutes.

8. The method according to claim 7, wherein the halogen gas is fluorine, the treatment time is 10 minutes and the partial pressure of fluorine is 50 mmHg.

9. The method according to claim 7, wherein the halogen gas is chlorine, the treatment time is 60 minutes and the partial pressure of chlorine is 50 mmHg.

10. The method according to claim 7, wherein the halogen gas is fluorine, the treatment time is 60 minutes and the partial pressure of the fluorine is 50 mmHg.

11. The method according to claim 7, wherein the halogen gas is fluorine, the treatment time is 10 minutes and the partial pressure of the fluorine is 200 mmHg.

12. The method according to claim 1, wherein the fly ash is a by-product of coal combustion in a power station.

13. The method according to claim 12, wherein the fly ash has the following composition: 55.1% $SiO_2$, 26.3% $Al_2O_3$, 5.4% $Fe_2O_3$, 3.3% $CaO$, 1.7% $MgO$, 0.53% $SO_3$ and 4.5% unburned carbon.

14. The cement according to claim 5, wherein the fly ash is in an amount of 10 wt %.

15. The cement according to claim 5, wherein the fly ash is in an amount of 25 wt %.

16. The cement according to claim 6, wherein the fly ash is in an amount of 10 wt %.

17. The cement according to claim 6, wherein the fly ash is in an amount of 25 wt. %.

18. The cement according to claim 4, wherein the fly ash has the following composition: 55.1% $SiO_2$, 26.3% $Al_2O_3$, 5.4% $Fe_2O_3$, 3.3% $CaO$, 1.7% $MgO$, 0.53% $SO_3$ and 4.5% unburned carbon.

* * * * *